(12) United States Patent
Pandit

(10) Patent No.: US 6,172,685 B1
(45) Date of Patent: Jan. 9, 2001

(54) METHOD AND APPARATUS FOR INCREASING THE AMOUNT AND UTILITY OF DISPLAYED INFORMATION

(75) Inventor: Milind S. Pandit, Beaverton, OR (US)

(73) Assignee: Intel Corporation, Santa Clara, CA (US)

(*) Notice: Under 35 U.S.C. 154(b), the term of this patent shall be extended for 0 days.

(21) Appl. No.: 08/977,463

(22) Filed: Nov. 24, 1997

(51) Int. Cl.[7] ............................................. G06T 11/00
(52) U.S. Cl. ................................. 345/471; 345/472
(58) Field of Search .................................. 345/127–132, 345/439, 467–472, 340, 342, 428; 382/282, 298–300

(56) References Cited

U.S. PATENT DOCUMENTS

| | | | |
|---|---|---|---|
| 4,239,351 | * 12/1980 | Williams et al. | 345/439 |
| 4,484,347 | * 11/1984 | Kashioka | 382/298 |
| 4,790,028 | 12/1988 | Ramage | 382/47 |
| 5,042,075 | * 8/1991 | Sato | 345/128 |
| 5,129,013 | * 7/1992 | Holzmann et al. | 345/112 |
| 5,227,771 | * 7/1993 | Kerr et al. | 340/731 |
| 5,530,942 | * 6/1996 | Tzou et al. | 395/147 |
| 5,623,588 | * 4/1997 | Gould | 395/326 |
| 5,670,984 | 9/1997 | Robertson et al. | 345/139 |
| 5,692,176 | * 11/1997 | Holt et al. | 395/605 |
| 5,699,535 | * 12/1997 | Amro | 395/342 |
| 5,726,766 | * 3/1998 | Saotome | 382/298 |
| 5,760,784 | * 6/1998 | Bullis et al. | 345/349 |
| 5,771,378 | * 6/1998 | Holt et al. | 395/605 |
| 5,835,087 | * 11/1998 | Herz et al. | 345/327 |
| 5,835,090 | * 11/1998 | Clark et al. | 345/339 |
| 5,893,095 | * 4/1999 | Jain et al. | 707/6 |
| 5,903,267 | * 5/1999 | Fisher | 345/341 |
| 5,982,369 | * 11/1999 | Sciammarella et al. | 345/349 |

OTHER PUBLICATIONS

Doug Shaffer et al., Navigating Hierarchically Clustered Networks through Fisheye and Full–Zoom Methods, ACM Transactions on Computer–Human Interaction, vol. 3, No. 2, Jun. 1996, pp. 162–188.

Michael Mills, Jonathan Cohen and Yin Yin Wong, A Magnifier Tool for Video Data, Proceedings of the 1992 ACM SIG–CHI Conference, May. 3–7, 1992, pp. 93–98.

Manojit Sarkar and Marc H. Brown, Graphical Fisheye Views of Graphs, Proceedings of the ACM SIGCHI '92 Conference on Human Factors in Computing Systems, May 1992.

Jock D. Mackinlay, George G. Robertson and Stuart K. Card, The Perspective Wall: Detail and Context Smoothly Integrated, Proceedings of the 1991 ACM SIG–CHI Conference, pp. 173–179.

George W. Furnas, Generalized Fisheye Views, Proceedings of the 1986 ACM SIG–CHI Conference, Apr. 1986, pp. 16–23.

* cited by examiner

Primary Examiner—Matthew Luu
Assistant Examiner—Anthony J. Blackman
(74) Attorney, Agent, or Firm—Blakely, Sokoloff, Taylor & Zafman LLP

(57) ABSTRACT

A method and apparatus for displaying data by determining an information content factor for a given datum and determining an information content threshold. The given datum is displayed if the information content factor of the given datum exceeds the information content threshold.

23 Claims, 5 Drawing Sheets

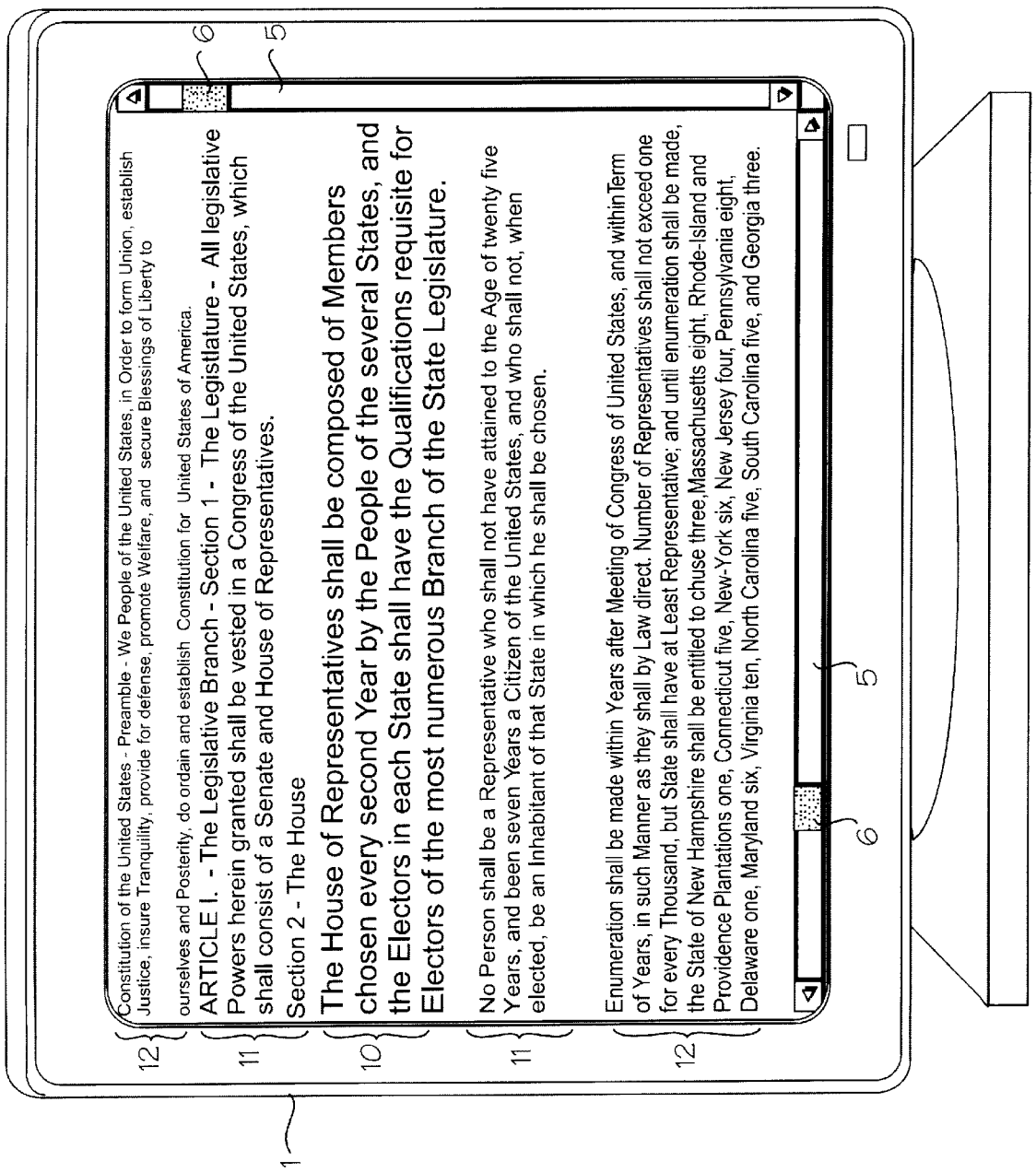

METHOD AND APPARATUS FOR INCREASING THE AMOUNT AND UTILITY OF DISPLAYED INFORMATION

BACKGROUND OF THE INVENTION

1. Field of the Invention

The invention relates generally to displaying information, and more specifically, to an apparatus and method for improving the amount and utility of displayed information.

2. Description of Related Art

The amount of information available to computers, such as personal computers (PCs), is growing at a phenomenal rate. Some sources claim that the internet doubles in size every six months. Computer processor power is also rapidly growing; according to some sources, doubling every 18 months. Display technology, however, has generally not improved at the same pace. A high-end monitor typically displays 1280 pixels horizontally and 1024 pixels vertically at 24 bits per pixel.

With known information display systems, such as a computer monitor, information is displayed in rectangular windows. The maximum size for a display window is the entire display screen of the monitor. If multiple windows are displayed, the size of each individual window is be considerably smaller. For example, the information displayed may comprise a text document. Words in a text document are typically displayed in one or more font sizes. As a result, the font sizes and the dimensions of the display window rectangle limit the number of words that can be made visible on the display. Conversely, to view more text on the display, a smaller font may be used, but this would make it difficult or even impossible to read the text displayed.

FIG. 1 illustrates a display device 1, such as a computer monitor, with an entire text page 2 displayed in a "page view" within a rectangular display window 3. As shown in FIG. 1, to display the entire text page 2, the font is extremely small, making the text nearly unreadable. FIG. 2 illustrates another alternative currently available for displaying text, wherein a larger sized font is used so that the text is easily read, but only a portion 4 of the entire text page 2 is displayed. A portion of the text page 2 displayed in FIG. 1 is displayed on the device 1 in FIG. 2. Since the entire text 2 from FIG. 1 cannot be made visible in its entirety when a readable-sized font is used, as illustrated in FIG. 2, it is made accessible through the use of scroll bars 5 to "move" the visible portion of the text 4 within the display window 3. The scroll bars 5 allow a user to scroll the displayed text 4 horizontally or vertically by clicking a mouse on the scroll bar 5 or by using the mouse to drag a marker 6 within the scroll bar 5, called a scroll box. The scroll boxes 6 further indicate the vertical and horizontal location of the viewed text in relation to the overall document based on the location of a scroll box 6 relative to the entire scroll bar 5.

Unfortunately, neither of the displays illustrated in FIG. 1 or FIG. 2 is satisfactory by itself. To read and manipulate given words in the text, the display of FIG. 2 is employed. To receive an indication of the relative location of the given words in relation to the entire text, the display of FIG. 1 is employed. Thus, an awkward process of toggling between the various views may be employed with known display systems.

A similar problem exists with display of video frames for digital moving pictures. Computer video, such as that coded using the Moving Picture Experts Group (MPEG) standard (for example, MPEG-1, part 2, ISO/IEC 11172-2:1993), is made up of a series of individual video frames. Each frame is a still image, and displaying the frames in quick succession creates the illusion of motion. When editing, studying or otherwise manipulating the video frames (as opposed to viewing the moving picture), the individual still frames are typically displayed in the rectangular window 3 on the display device 1. As with text, the size of the video frame and the size of the display window 3 limit the number of frames that are visible in the display window 3 and also determine the amount of detail discernible in any given video frame. If the video frames are displayed large enough to see details within the frame, all the frames of the video are typically not visible in the display window, and the scroll bars 5 are employed to access the frames not immediately displayed. To ascertain the position of a given frame in relation to the entire video or determine the overall size of the video, the frame size may be reduced to a point where details are lost.

Thus, a need exists for a display device and method that allows a user to see a large amount of data in a display, while at the same time, maintaining the ability to view details of data that are of immediate interest.

SUMMARY OF THE INVENTION

In one aspect of the present invention, a method of displaying data includes determining an information content factor for a given datum and determining an information content threshold. The given datum is displayed if the information content factor of the given datum exceeds the information content threshold.

In another aspect of the invention, an apparatus for displaying data includes a monitor having a display screen and a processor. The processor is programmed to determine an information content factor for a given datum, compare the information content factor to a predetermined information content threshold, and display the given datum on the display screen if the information content factor exceeds the threshold.

BRIEF DESCRIPTION OF THE DRAWINGS

Other objects and advantages of the invention will become apparent upon reading the following detailed description and upon reference to the drawings in which:

FIG. 7 illustrates a display screen containing an example of how a textual document may be displayed in an embodiment of the invention.

Figure 1:
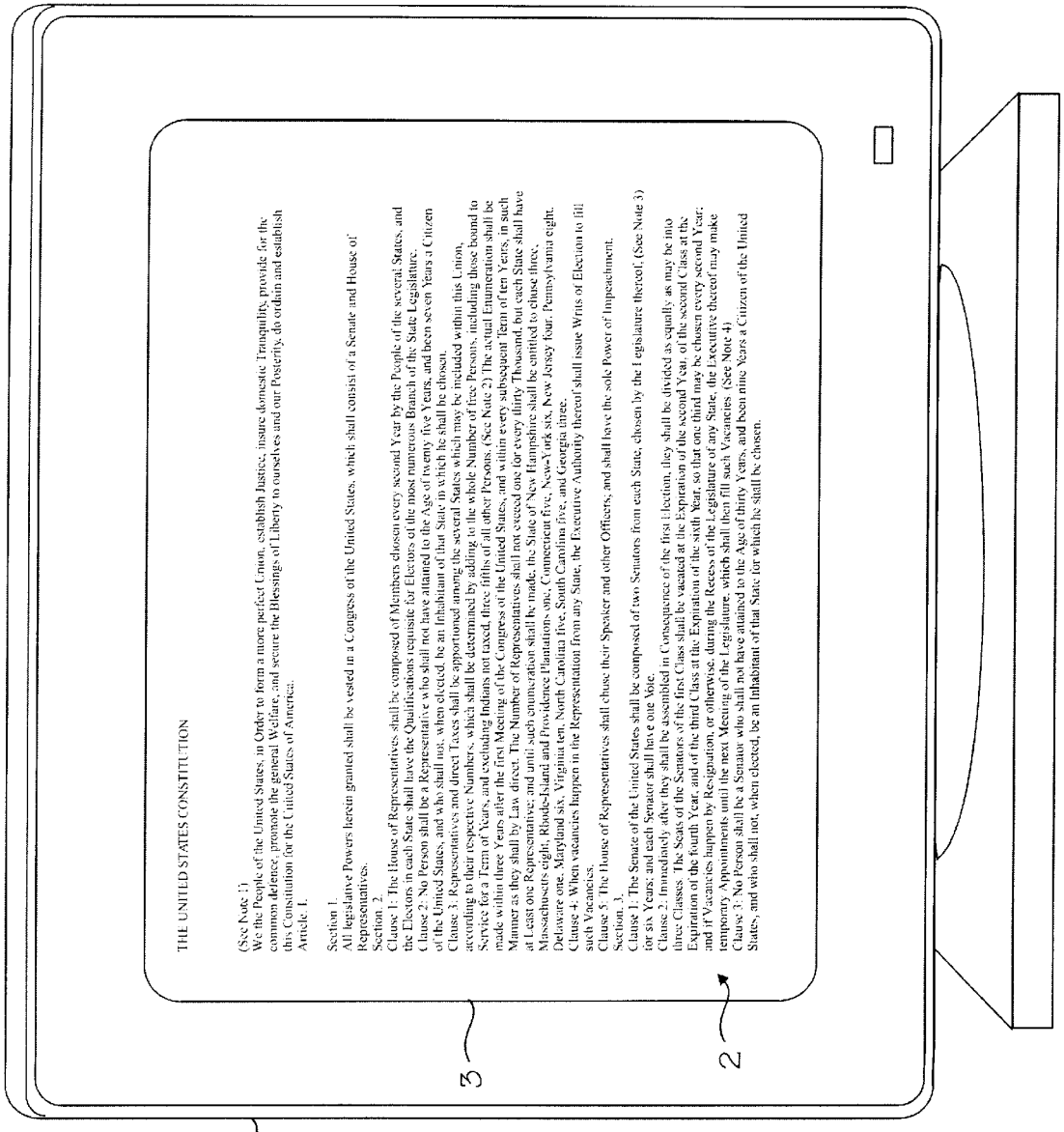
FIG. 1 illustrates a prior art device displaying a page of text in a "page view."

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3:
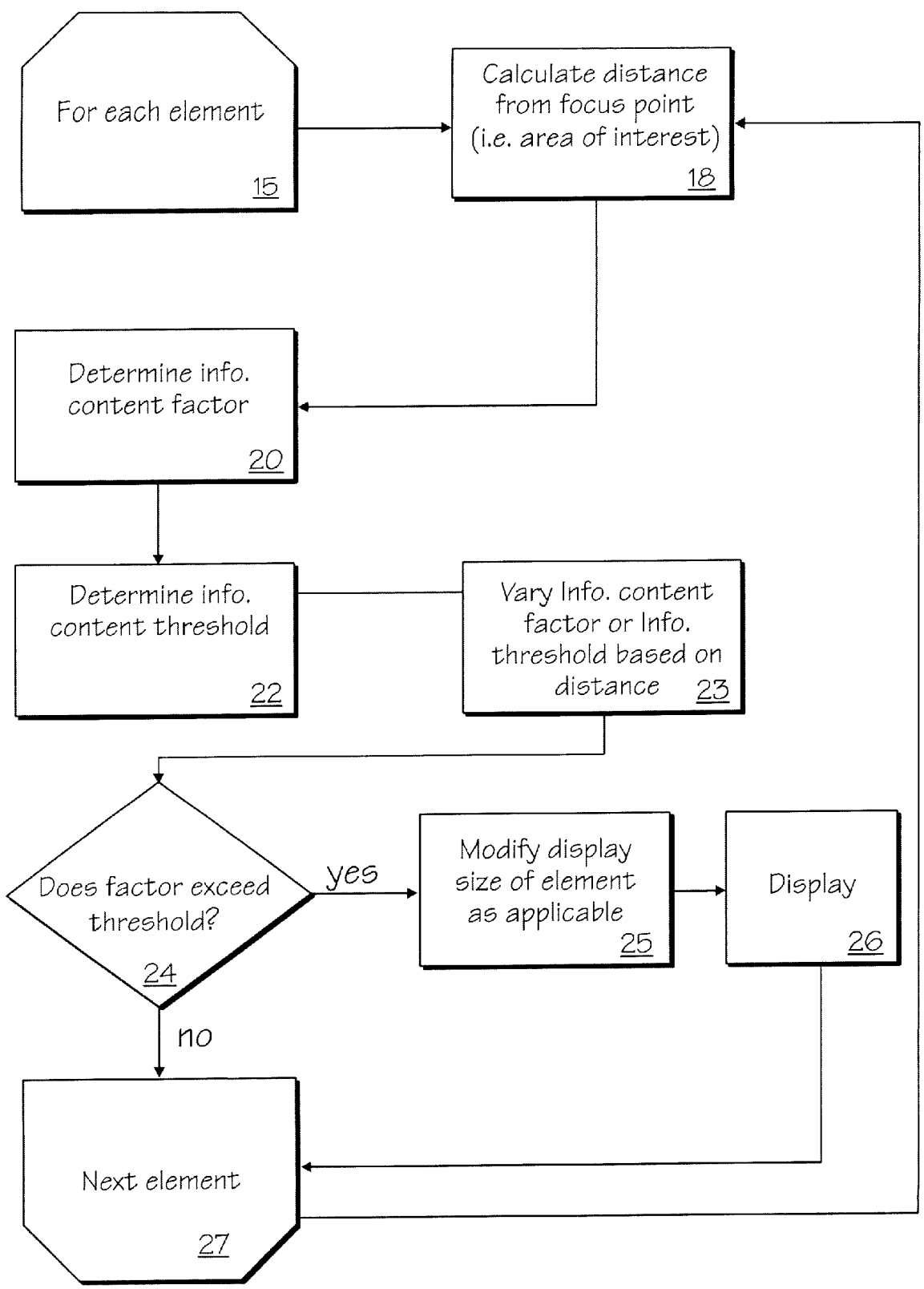
FIG. 3 is a flow diagram of an embodiment of a method for displaying data in accordance with the present invention.

A flow diagram of an embodiment of a method for displaying data in accordance with the present invention is illustrated in FIG. 3. Data displayed may include text graphics, etc. The method of FIG. 3 operates to improve the information content of the displayed data. For each datum being considered the distance between a focus point, which may be indicated by a user, and the datum is determined as shown in block 18, and, an information content factor is determined in block 20. The information content factor assigns a value to the datum that is based on the information provided by the considered datum. The datum, for example, may be a given word in a text document or a given portion of a picture, though the present invention is not limited to these particular data forms.

In block 22, an information content threshold is determined to which the information contact factor is compared in decision block 24. Prior to performing the comparison, the information content factor or the information threshold may be varied based on the distance between the focus point and the datum as shown in block 23. The information content threshold determines whether the given datum is displayed. If the information content factor exceeds the threshold, the datum is displayed in block 26 and the next datum is considered. If the information content does not exceed the threshold, the datum is not displayed and the next datum is considered.

This embodiment may include varying the display size of the data based at least in part on the distance of a given datum being considered from a focus point as shown in block 25. Any appropriate distance measurement may be employed. For example, if the data comprise text, each word in the text may be sequentially numbered, and the distance is the difference between the number of a word at the focus point and the number of the given word. The information content threshold may then be varied, such that the threshold changes as the distance between the given datum and the focus point changes. Thus, if the given datum is a great distance from the focus point, it may require a relatively high information content in order for it to be displayed.

Figure 4:
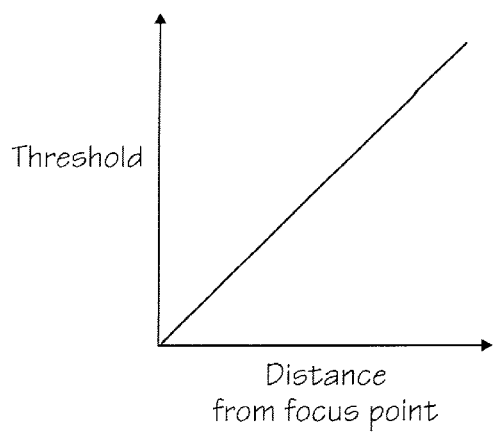
FIG. 4 is a graph showing the relationship between the information content threshold and the distance from the focus point in accordance with an embodiment of the present invention.

FIG. 4 is an example of a graph that may be used to determine the information content threshold at a given distance from the focus point. The information content of the given datum is compared to the information content threshold for the calculated distance from the focus point. Data that exceed the threshold at the specified distance are displayed, and data that do not exceed the threshold are filtered out. Alternately, the information content factor may be varied as a function of the distance from the given datum to the focus point and compared to a constant information content threshold, or both the information content factor and threshold may be varied based at least in part on the distance from the given datum to the focus point.

The relationship between distance and the information content threshold may be either monotonically increasing or constant. Thus, the threshold increases or remains constant as the distance from the focus point increases and therefore, the greater the distance of the given datum from the focus point, the more likely it is to be filtered out. Based on the relationship between distance and the information content threshold, the likelihood of the given datum being displayed may remain constant, or increase constantly, exponentially, or discontinuously. In alternate embodiments in which the information content factor varies with distance, the relationship between distance and the information content factor may be reversed, for example, such that the information content factor decreases as distance from the focus point increases.

Figure 5:
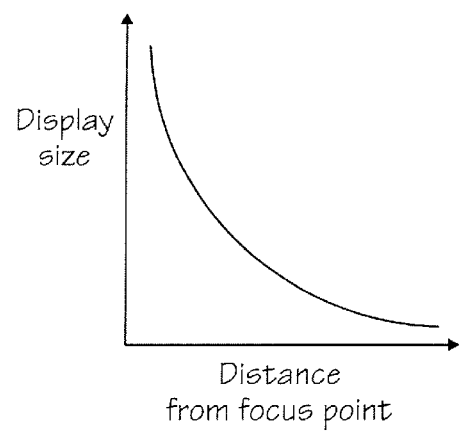
FIG. 5 is a graph showing the relationship between display size and the distance from the focus point in accordance with an embodiment of the invention.

In a similar manner, FIG. 5 illustrates the relationship between display size and the distance from the focus point. The display size may vary non-linearly based at least in part on the distance from the given datum to the focus point, as illustrated in FIG. 5, or the display size may vary linearly. Thus, in a specific embodiment in accordance with the invention, the display size of the given datum decreases as the distance of the given datum from the focus point increases.

Figure 6:
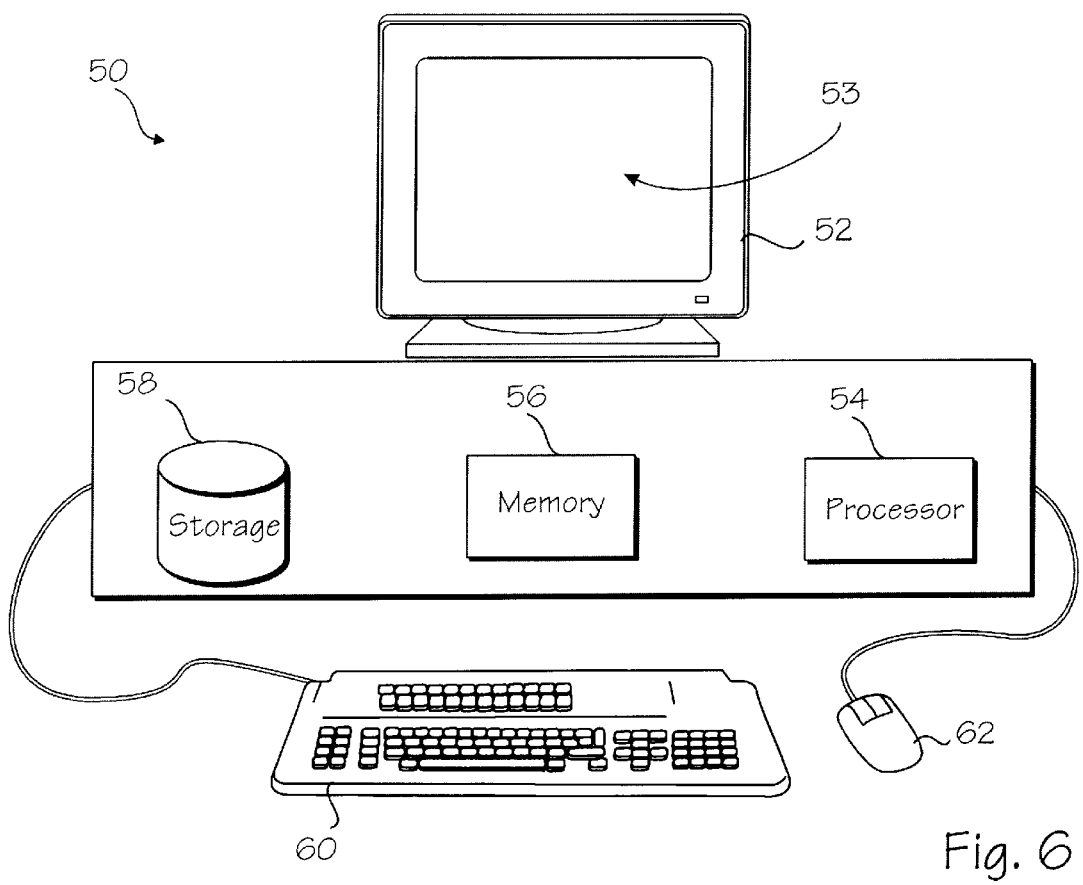
FIG. 6 illustrates an embodiment of an apparatus for displaying data in accordance with an embodiment of the invention.

FIG. 6 illustrates an apparatus 50 for displaying data in accordance with an embodiment of the invention. The embodiment includes a monitor 52 having display screen 53, a processor 54, a main memory 56, at least one storage device 58 and an operator input device, which in the apparatus 50 of FIG. 6 comprises a keyboard 60 and a mouse 62. The apparatus 50 as illustrated in FIG. 6 is embodied in a personal computer (PC) system, as is known in the art, though the invention is not limited to PCs. One skilled in the art having the benefit of this disclosure may implement the present invention in other types of systems, for example, a mini-computer, an engineering workstation, an operator terminal connected to a main-frame computer, etc.

The processor 54 may be any conventional general purpose single- or multi-chip microprocessor such as a Pentium® processor, a Pentium® Pro processor, an 8051 processor available from Intel Corp., Santa Clara, Calif.; a MIPS® processor available from Silicone Graphics Inc.; a Power PC® processor available from Motorola, Inc.; an ALPHA® processor available from Digital Equipment Corp.; or the like. The storage device 58 may comprise standard computer readable devices, as are known in the art, such as a computer hard drive, a compact disk, a floppy disk, a tape cassette, etc. The monitor 52 may be a standard computer monitor having a cathode ray tube (CRT) or liquid crystal display (LCD), for example.

In an embodiment in accordance with the invention, the storage device 58 contains program instructions that, when executed by the processor, implement an embodiment of the method of the present invention. The storage device 58 may further contain the data to be displayed. The program instructions are copied from the storage device 58 to the main memory 56, where they are executed by the processor 54 to display the data on the display device 52 in accordance with the invention.

In a particular embodiment of the invention, the data displayed comprise text as illustrated in FIG. 7. For purposes of this disclosure, text is defined as a sequence of words, each with a unique position. An example of a text is a document that may be displayed and manipulated using a standard word processing program such as Microsoft® Word, Corel® WordPerfect®, etc. A user identifies the focus point 10 within the text, indicating which portion of the text, such as a group of words, are of immediate interest. The focus point 10 may be indicated in several different manners, such as pointing and clicking the mouse 62 or by manipulating a scroll bar 5 with the mouse 62 or the keys on the keyboard 60.

Figure 2:
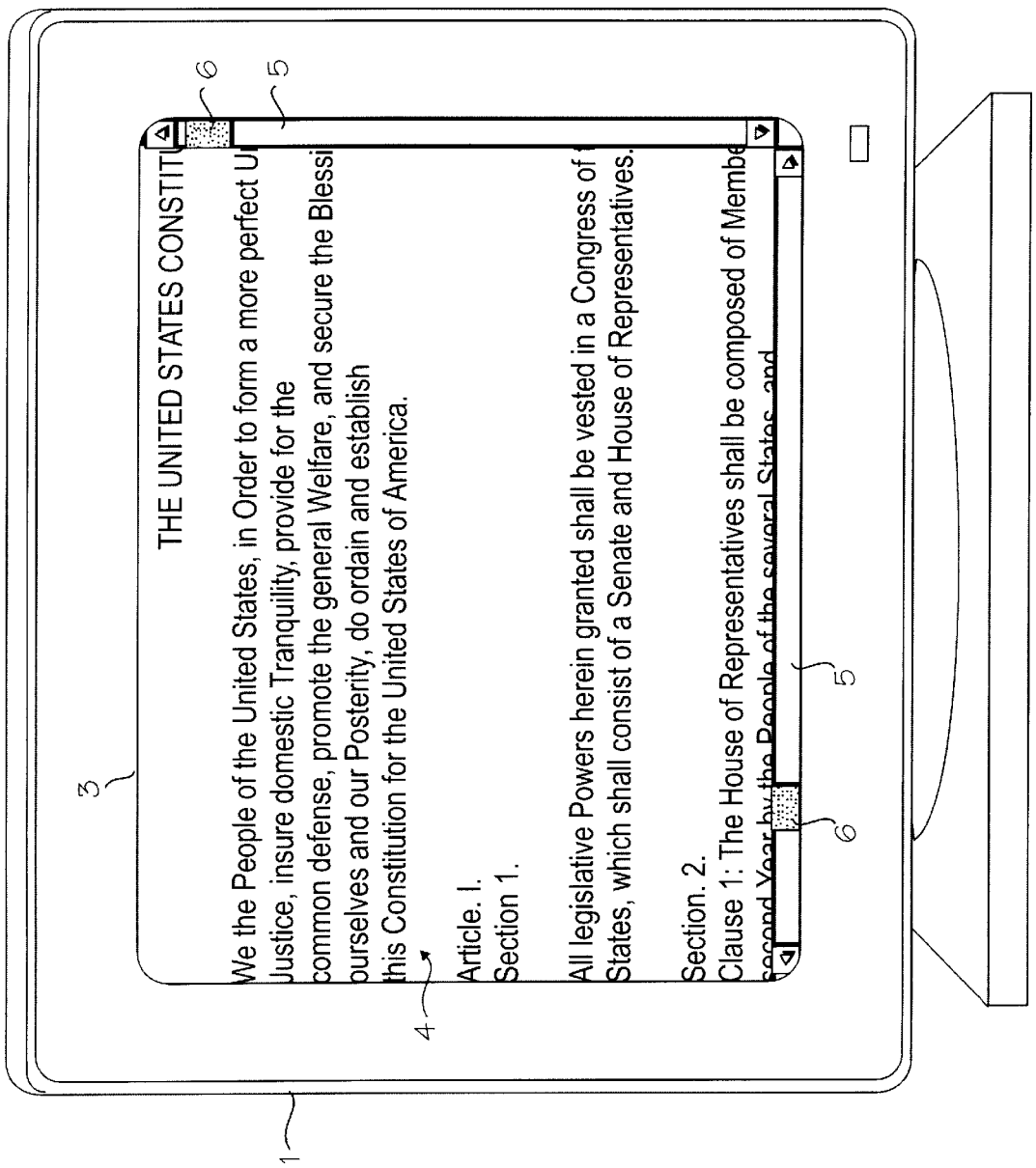
FIG. 2 illustrates a prior art device displaying a portion of the text displayed in FIG. 1.

When implemented to display text, an embodiment of the present invention balances the text author's desire to display particular words in a particular fashion, the user's desire to see many words in a small area, and the user's desire to improve the information content of the displayed words. To this end, words in the immediate vicinity of the focus point 10 are displayed in the traditional manner, allowing the user to see the words that are of immediate interest as intended by the author. Outside the immediate vicinity of the focus point, the amount and utility of the displayed text 11 & 12 is increased by information filtering and font reduction. For example, in FIG. 3, text 11 is reduced to a 10 pt font compared to the 12 pt text in the focus point 10. Additionally, common adjectives such "the," "a," and "this" have been removed. Text 12 is reduced to 8 pt, and most adjectives and adverbs have been removed. Advantageously, a larger portion of the document is presented on the display as when compared to FIG. 2.

In an embodiment of the invention, the information content of a given portion of the text, such as a word in the text, is measured to determine an information content factor used to filter the text. Several known information measures may be used to determine the information content factor of a given word, such as the word's frequency of occurrence in the text, the number of characters in the word or heuristics based on the given word's syntactic role. The information content factor for a given word may be determined at least in part based upon the portion of the text displayed in the display window, the entire text, a set of text documents, or a combination thereof.

There are several techniques known in the field of information retrieval for determining the "weight," or information content, of a word in English text. In information retrieval, these weights are associated with the words in a query, and used to search for relevant documents out of a large set. One technique is known as term frequency-inverse document frequency (TF-IDF) and is documented in *Introduction to Modern Information Retrieval,* by Gerard Salton and Michael J. McGill, 1983, McGraw-Hill, which is incorporated herein by reference in its entirety. Given a large set of documents, the information content factor of each word in the set may be determined in accordance with $$tf_{ik}*(\log_2(n)-\log_2(df_k)+1)$$

where $tf_{ik}$ is the number of times the given word k occurs in the text document i, $df_k$ is the number of documents in which the given word k occurs, and n is the total number of texts in the collection. Given a suitably large set of texts, the information content factor of any desired word may be determined.

Another suitable technique for generating an information content factor in accordance with an embodiment of the invention is known as natural language parsing. Such techniques are documented in *Natural Language Understanding,* by James Allen, 1987, Benjamin/Cummings Publishing Co., Menlo Park, incorporated herein by reference in its entirety. With natural language parsing techniques, a parse tree for a sentence is generated. Once the parse tree is generated, heuristics may be used to rank the words in the sentence by importance. The ranking may then be used to determine the information content factor. For example, adverbs may be ranked lower than the verbs they modify, etc.

An information content threshold determines whether the given word is displayed. The threshold may increase as the given word's distance from the focus point increases, and further, the threshold may increase as a linear or non linear function of the given word's distance from the focus point. In an embodiment of the invention, the information content threshold increases monotonically as the given word's distance from the focus point increases, though the invention is not limited to monotonically increasing information content thresholds. Thus, in the vicinity of the focus point, all words are displayed in a specific embodiment of the invention. At large distances from the focus point, only the highest-information-content words are displayed. Further, the information content factor may be varied in addition to, or instead of, the information content threshold as a function of the distance from the focus point.

Outside the vicinity of the focus point, the number of words in the text displayed may be further increased by reducing the font size. In the immediate vicinity of the focus point, words are displayed in the normal font size. As the distance of a given word from the focus point increases, the word is displayed in a smaller font size. As a result, more words may be made to fit in a given rectangular display window. The font size may decrease as a linear or non-linear function of the given word's distance from the focus point.

In another specific embodiment of the invention, the displayed data comprise still video frames. This embodiment of the present invention is concerned with the display of video not as a continuous stream resulting in a moving picture, but rather, as a series of individual video frames. Hence, for the purposes of this disclosure, video is defined as a sequence of frames, each with a unique position. Video frames are often displayed in this manner when editing, studying, or otherwise manipulating the video. As with words in a text, if the video frames are displayed using a known display device such as the monitor 52 in a size sufficient to allow discerning details in the frame, the entire video will not usually fit in the display window 53. Since the video is not visible in its entirety, it is made accessible through the use of scroll bars.

In a manner similar to text display, the video embodiment of the present invention allows a user to display particular frames as intended by the author, while at the same time, permitting the user to see many frames in a display window and improve the information content of the displayed frames. The user specifies a focus point within a video, indicating which frames are of immediate interest. The focus point may be specified, for example, by pointing and clicking the mouse 62 or by manipulating a scroll bar with the mouse 62 or keyboard 60.

An information content factor is calculated for each frame in the video. Measures for calculating the information content factor include the difference between a given frame and the previous frame, the distance of the given frame from a "key frame" in MPEG compression, or heuristics based on a parse of the video. Techniques for determining the visual difference between two video frames are surveyed in "Video Parsing and Browsing Using Compressed Data," by Hongjiang Zhang, Chien Yong Low, and Stephen W. Smoliar, in *Multimedia Tools and Applications,* 1, 89–111 (1995), Kluwer Academic Publishers, Boston, incorporated herein by reference in its entirety.

These techniques assign values to video frames based at least in part on the visual differences between frames. In one technique, a high information content factor is assigned to a frame that represents fast motion or sudden scene changes. In a like manner, a low factor is assigned to a frame that represents slow motion, no motion, or a continuous scene. The information content factor may be assigned to a given frame based on the difference between the given frame and another predetermined frame, such as an adjacent frame, for example.

As with text, the video frame information content factor may be compared to an information content threshold that may vary linearly or non-linearly as based at least in part on the distance from the focus point. In a particular embodiment, the information content threshold increases monotonically as the distance from the focus point increases. The information content factor may be varied based on the distance from the focus rather than varying the threshold, or the information content factor may be varied in addition to varying the threshold. If the information content factor of a given frame exceeds the threshold, at least a portion of the given frame is displayed.

Further, the number of frames displayed may be increased by frame size reduction. In the immediate vicinity of the focus point, frames are displayed in a predetermined size that allows viewing sufficient details of the video. As the distance of a given frame from the focus point increases, the frame is displayed in a smaller size. As a result, more frames can be made to fit in a given rectangular display window. The frame size may decrease as a linear or non-linear function of the frame's distance from the focus point.

Thus, the embodiments in accordance with the present invention address shortcomings of the prior art and provide an apparatus and method for maximizing the information content and amount of displayed data. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of displaying data comprising:
    calculating a spatial distance from an area of interest within a plurality of associated elements to a first element within the plurality of associated elements but outside of the area of interest, the area of interest comprising one or more elements of the plurality of associated elements to be displayed in their entirety;
    determining dynamically an information content factor for the first element within the plurality of associated elements, the information content factor comprising a measure of one or more characteristics of the first element relative to other elements within the plurality of associated elements;
    determining an information content threshold, the information content threshold comprising a benchmark value of information content against which the information content factor for the first element is compared;
    varying the information content threshold or the information content factor based on the spatial distance; and
    automatically determining whether to display the first element based on the information content factor and the information content threshold.

2. The method of claim 1, further comprising receiving an indication of the area of interest.

3. The method of claim 1, further comprising calculating the area of interest based on the nature of the plurality of associated elements.

4. The method of claim 1, further comprising determining whether to vary the displayed size of the first element relative to other displayed elements of the plurality of associated elements based on the information content factor relative to the information content threshold.

5. The method of claim 1, wherein the plurality of associated elements comprise a plurality of video frames.

6. The method of claim 4, wherein the displayed size of the first element is decreased relative to other displayed elements in a substantially non-linear manner as the distance increases.

7. The method of claim 1, wherein the plurality of associated elements comprise text, and wherein said determining an information content factor for the first element comprises determining an information content factor for a given portion of the text.

8. A method of displaying text comprising:
    calculating a spatial distance from a given portion of the text to a portion of the text that is of immediate interest;
    determining a measure of information content for the given portion of text;
    determining an information content threshold, the information content threshold comprising a benchmark value of information content against which the information content factor for the first element is compared;
    varying at least one of the information content threshold and the measure of information content as a function of the spatial distance; and
    displaying the given portion of the text if the measure of information content exceeds the information content threshold.

9. The method of claim 8, wherein the given portion of the text comprises a given word in the text and wherein said determining an information content factor for the first element comprises determining an information content factor for the given word.

10. The method of claim 8, wherein said displaying the given portion of the text further comprises varying the display size of the given portion of the text at least in part based on the distance.

11. The method of claim 10, wherein the text is displayed using a font having a size, and wherein said varying the display size of the given portion of the text step comprises changing the font size of the given portion of the text.

12. The method of claim 8, wherein the information content factor is determined at least in part based on the syntactic role of the given portion of the text.

13. An apparatus for displaying data comprising:
    a display screen;
    a processor programmed to determine a measure of information content for a first element of a plurality of associated elements, compare the measure of information content to a predetermined information content threshold, and display the first element on the display screen if the measure of information content exceeds the information content threshold; and an input device with which a user of the apparatus is capable of indicating an area of interest on a display within the plurality of associated elements; and wherein the processor is further programmed to calculate the distance from the first element to the area of interest and vary at least one of the information content threshold and the measure of information content based at least in part on the calculated distance.

14. The apparatus of claim 13, further comprising a storage device having stored therein the plurality of associated elements.

15. The apparatus of claim 13, wherein the processor is further programmed to vary the display size of the first element as a function of the calculated distance.

16. A computer-readable medium having computer-executable instructions stored thereon, the instructions when executed causing the computer to:

calculate a spatial distance from an area of interest within a plurality of associated elements to a first element within the plurality of associated elements but outside of the area of interest, the area of interest comprising one or more elements of the plurality of associated elements to be displayed in their entirety;

determine dynamically a measure of information content for a first element, the measure of information content factor comprising a measure of one or more characteristics of the first element relative to other elements within the plurality of associated elements;

determine an information content threshold, the information content threshold comprising a benchmark value of information content against which the information content factor for the first element is compared;

vary at least one of the information content threshold and the measure of information content as a function of the spatial distance; and automatically display the first element if the measure of information content of the first element exceeds the information content threshold.

17. The computer-readable medium of claim 16, further comprising the step of varying the display size of the first element based at least in part on the distance.

18. The method of claim 1, wherein said varying the information content threshold further comprises increasing the information content threshold substantially linearly as the distance increases.

19. The method of claim 1, wherein said varying the information content threshold further comprises increasing the information content threshold substantially monotonically as the distance increases.

20. The method of claim 8, wherein the measure of information content is determined at least in part based on the frequency of occurrence of the given portion of the text.

21. The method of claim 8, wherein the measure of information content is determined in accordance with $tf_{ik}*(\log_2(n)-\log_2(df_k)+1)$; where $tf_{ik}$ is the number of times the given portion of text k occurs in the text i, $df_k$ is the number of texts in a collection of texts in which the given portion of the text k occurs, and n is the total number of texts in the collection.

22. The apparatus of claim 15, wherein the processor is further programmed to increase the information content threshold monotonically as the calculated distance increases.

23. A method of displaying data comprising:

calculating a spatial distance from an area of interest within a plurality of associated elements to a first element within the plurality of associated elements but outside of the area of interest, the area of interest comprising one or more elements of the plurality of associated elements to be displayed in their entirety;

determining dynamically an information content factor for the first element within the plurality of associated elements, the information content factor comprising a measure of one or more characteristics of the first element relative to other elements within the plurality of associated elements;

determining an information content threshold, the information content threshold comprising a benchmark value of information content against which the information content factor for the first element is compared;

varying the information content threshold or the information content factor based on the spatial distance;

automatically determining whether to display the first element based on the information content factor and the information content threshold; and if the first element is to be displayed, automatically determining whether to vary the displayed size of the first element relative to other displayed elements of the plurality of associated elements based on the information content factor relative to the information content threshold, wherein the displayed size of the first element is decreased relative to other displayed elements in a substantially non-linear manner as the distance increases.

* * * * *

UNITED STATES PATENT AND TRADEMARK OFFICE
CERTIFICATE OF CORRECTION

PATENT NO. : 6,172,685 B1
DATED : January 9, 2001
INVENTOR(S) : Pandit et al.

It is certified that error appears in the above-identified patent and that said Letters Patent is hereby corrected as shown below:

Column 3,
Lines 29, 31, 34, 44, 45, 47, 48, 49, 50, 53, 60, 61 and 67, delete "datum" and replace with -- element --.
Line 35, delete both occurrences of "datum" and replace with-- element --.
Line 50, after "considered" insert -- in block 27 --.

Column 4,
Line 9, delete "datum" and replace with -- element --.

Signed and Sealed this

Twenty-third Day of July, 2002

Attest:

JAMES E. ROGAN
Attesting Officer
Director of the United States Patent and Trademark Office